United States Patent
Hatter et al.

(10) Patent No.: US 7,590,852 B2
(45) Date of Patent: Sep. 15, 2009

(54) METHOD FOR REMOTE ELECTRONIC VERIFICATION AND AUTHENTICATION AND SCREENING OF POTENTIAL SIGNATORIES FOR REMOTE ELECTRONIC NOTARY TRANSACTIONS VIA REMOTE PC ENCRYPTED PLATFORM TO A BROADBAND DIGITALLY WIRELESS CELLULAR/PDA DEVICE OR PORTABLE PC DEVICE

(76) Inventors: Jesse Andrew Hatter, 573 Pointe Vista Ct., Corona, CA (US) 92881; Brenda Faye Hatter, 573 Pointe Vista Ct., Corona, CA (US) 92881; Rosie Jean Hatter, 1202 W. 129th St., Compton, CA (US) 90222

( * ) Notice: Subject to any disclaimer, the term of this patent is extended or adjusted under 35 U.S.C. 154(b) by 0 days.

(21) Appl. No.: 11/880,618

(22) Filed: Jul. 23, 2007

(65) Prior Publication Data

US 2008/0028455 A1    Jan. 31, 2008

Related U.S. Application Data

(60) Provisional application No. 60/833,003, filed on Jul. 25, 2006.

(51) Int. Cl.
*G06F 21/00* (2006.01)

(52) U.S. Cl. .................... 713/176; 713/171; 713/179; 713/180; 713/186; 726/2; 726/10; 345/156

(58) Field of Classification Search ............ 713/176, 713/186, 179, 180, 171; 726/2, 10; 345/156
See application file for complete search history.

(56) References Cited

U.S. PATENT DOCUMENTS

| | | | |
|---|---|---|---|
| 5,872,848 A * | 2/1999 | Romney et al. ............ | 713/176 |
| 5,899,991 A * | 5/1999 | Karch ...................... | 707/5 |
| 6,064,751 A * | 5/2000 | Smithies et al. ............ | 382/115 |
| 6,807,226 B1 * | 10/2004 | Suetsugu et al. ............ | 375/224 |
| 6,904,416 B2 * | 6/2005 | Nassiri ..................... | 705/51 |
| 6,948,066 B2 * | 9/2005 | Hind et al. ................. | 713/168 |
| 7,028,184 B2 * | 4/2006 | Hind et al. ................. | 713/170 |
| 7,096,005 B2 | 8/2006 | Lai et al. | |
| 7,130,452 B2 | 10/2006 | Bolle et al. | |
| 7,181,017 B1 * | 2/2007 | Nagel et al. ............... | 380/282 |
| 7,269,585 B1 * | 9/2007 | Burke ....................... | 707/3 |
| 7,430,674 B2 * | 9/2008 | von Mueller et al. ........ | 713/300 |
| 2001/0030231 A1 * | 10/2001 | Grossman ................ | 235/375 |
| 2002/0016910 A1 * | 2/2002 | Wright et al. ............. | 713/150 |
| 2002/0023220 A1 * | 2/2002 | Kaplan ..................... | 713/176 |
| 2002/0042879 A1 * | 4/2002 | Gould et al. ............... | 713/176 |
| 2002/0052896 A1 * | 5/2002 | Streit et al. ............... | 707/517 |
| 2002/0143711 A1 | 10/2002 | Nassiri | |
| 2003/0018897 A1 * | 1/2003 | Bellis et al. ............... | 713/182 |
| 2003/0154414 A1 * | 8/2003 | von Mueller et al. ........ | 713/300 |

(Continued)

*Primary Examiner*—Carl Colin
(74) *Attorney, Agent, or Firm*—Kirk A. Buhler; Buhler & Associates

(57) ABSTRACT

A virtual notary Kiosk is disclosed for performing live electronic personal signatory verification, authentication and screening for the purpose of transacting remote electronic notarizations with live notaries. The virtual notary is a process that is compliant with the Uniform Electronic Transaction Act, and Electronic Signatures in Global and National Commerce Act. The virtual notary incorporates several electronic components, (digital web cam, electronic signature and thumbprint pad, electronic notary seal, electronic notary journal, video/audio transmission software for cellular/PDA or portable pc device, P.O.S. {point of sale} device, and electronic transaction manager {computer}, electronic scanner/printer, electronic remote notary/client software); all of the aforementioned allow both potential signatory and notary to execute electronic notarizations from remote locations.

20 Claims, 4 Drawing Sheets

U.S. PATENT DOCUMENTS

2005/0044369 A1* 2/2005 Anantharaman ............ 713/176
2006/0193004 A1* 8/2006 Wasilewski et al. ........ 358/1.15
2007/0050303 A1* 3/2007 Schroeder et al. ............ 705/67
2007/0174629 A1* 7/2007 Suominen ................... 713/182
2007/0198435 A1* 8/2007 Siegal et al. .................. 705/67

* cited by examiner

METHOD FOR REMOTE ELECTRONIC VERIFICATION AND AUTHENTICATION AND SCREENING OF POTENTIAL SIGNATORIES FOR REMOTE ELECTRONIC NOTARY TRANSACTIONS VIA REMOTE PC ENCRYPTED PLATFORM TO A BROADBAND DIGITALLY WIRELESS CELLULAR/PDA DEVICE OR PORTABLE PC DEVICE

CROSS REFERENCE TO RELATED APPLICATION

This application claims the benefit of Provisional 60/833,003 filed Jul. 25, 2006 the entire contents of which is hereby expressly incorporated by reference herein.

FIELD OF THE INVENTION

This invention relates to a virtual notary, more particularly, performing live electronic personal signatory verification, authentication and screening for the purpose of transacting remote electronic notarizations with live notaries. The virtual notary is a process that is compliant with the Uniform Electronic Transaction Act, and Electronic Signatures in Global and National Commerce Act. The virtual notary incorporates several electronic components, (digital web cam, electronic signature and thumbprint pad, electronic notary seal, electronic notary journal, video/audio transmission software for cellular/PDA or portable pc device, P.O.S. {point of sale} device, and electronic transaction manager {computer}, electronic scanner/printer, electronic remote notary/client software); all of the aforementioned allow both potential signatory and notary to execute electronic notarizations from remote locations.

BACKGROUND OF THE INVENTION

This virtual notary deals with offering a modified alternative to traditional notarization, specifically the emerging environment of e-notarization as it continues to interface with e-commerce. However the nexus and undercurrent to this invention is the unyielding problem of identity theft. As the novelty of the internet continues to be supplanted by the practical everyday needs of the general public, the exposure for identity theft has risen arid there currently is no solution to stem it or significantly minimize the impact of its effect upon the lives of those individuals who potentially can become its victim. The internet is the premier source for all e-commerce activity and it is driven by the idea of convenience. Nonetheless, with this medium of convenience comes without conventional prejudice extreme exposure for identity theft.

However, the now federally mandated and enacted Electronic Signatures in Global and National Commerce Act (E-SIGN), coupled with the State level mandated and enacted Uniform Electronic Transaction Act (UETA), both bear the platform whereby unique innovations previously impractical and illegal can now become an integral part of the fight against the scourge of identity theft. According to the time honored notarization process and also the 2002 Model Notary Act sponsored by the National Notary Association (NNA), there are two cornerstone rules that underlie the notarization process. The first is that the fundamental principles of the traditional notarization must remain the same regardless of the technology used to create a signature.

No principle is more critical to notarization than that the signer must appear in person before a duly commissioned notary public to affix or acknowledge the signature and be screened for identity, volition, and basic awareness by the notary. While technology may be perfectible, the basic nature of the human beings who use it, unfortunately, is not. Any process—paper-based or electronic—that is called notarization of a signature must involve the personal physical appearance of a principal before a commissioned notary. Contrary to popular understanding, electronic notarization does not mean "remote" notarization, with the notary before a computer at Location A and the principal before a computer at Location B. In the Act, the definitions of the common notarizations apply both to paper and electronic documents, and all embody the fundamental principle that "the signer must appear in person" before the notary at the time of notarization. The second cornerstone of the article is technology neutrality. The Act posits software performance standards for electronic notarization which any qualifying technology must meet.

The aforementioned are comments that are found within the Model Notary Act of 2002, however as noted in the explanation of what the "comment" intent is; it reads in the FOREWORD section of the Model Notary Act: "comments are not an official part of the proposed legislation text". The reason for this inclusion of information from the (NNA) is to show that within the field of this invention the (NNA) is aware that remote notarization is possible yet un-endorsable because of the seemingly tall hurdle of "personal appearance" vs. electronic imagery authentication/verification. This invention again passes over this hurdle not only without knocking it down but rather perfects the signatory verification process with great efficacy and precision.

The main idea of the Notary is to be a witness for the Secretary of the State wherein the Notary is commissioned. Yet, because of technology as is suggested in the Model Notary Act, the "technology neutrality" that the "Act" maintains cannot deny the opportunity for the e-notarization process, in its electronic evolution, to deter improvements that are provided for by both (E-SIGN) and (UETA). Again these Acts are the platforms for innovative approaches that will inchoate the remote electronic verification of a potential signatory. Therefore on the authority of both Acts the following is recited as sections along with observations concerning the invention is presented beginning with the (E-SIGN) Act, 15 U.S. SEC. 7006 CHAPTER 96 SUBCHAPTER 1:

ELECTRONIC RECORDS AND SIGNATURES IN COMMERCE

Section 7006: Definitions (2) Electronic

The term "electronic" means relating to technology having electrical, digital, magnetic, wireless, optical, electromagnetic, or similar capabilities This provision clearly identifies the opportunity for digital and wireless or optical technology to be employed as part of the process for signatory verification.

(3) Electronic Agent

The term "electronic agent" means a computer program or an electronic or other automated means used independently to initiate an action or respond to electronic records or performances in whole or in part without review or action by an individual at the time of the action or response.

This provision opens the door for the invention of a device that will be the actual medium for electronic remote notarization.

(4) Electronic Record

The term "electronic record" means a contract or other record created, generated, sent, communicated, received, or stored by electronic means.

(5) Electronic Signature

The term "electronic signature" means an electronic sound, symbol, or process, attached to or logically associated with a contract or other record and executed or adopted by a person with the intent to sign the record.

(7) Information

The term "information" means data, text, images, sounds, codes, computer programs, software, databases, or the like.

This is the most important provision that this legislative text has to offer as it pertains to this invention. This particular text uses the word "IMAGES" and the phrase "OR THE LIKE", that allows for the employment of video cellular technology to ultimately be the basis for function of this invention.

(8) Person

The term "person" means an individual, corporation, business trust, estate, trust, partnership, limited liability company, association, joint venture, governmental agency, public corporation, or any other legal or commercial entity.

(9) Record

The term "record" means information that is inscribed on a tangible medium; or that is stored in an electronic or other medium and is retrievable in perceivable form.

(13) Transaction

The term "transaction" means an action or set of actions relating to the conduct of business, consumer, or commercial affairs between two or more persons, including any of the following types of conduct—

(A) The sale, lease, exchange, licensing, or other disposition of (i) personal property, including goods and intangibles, (ii) services, and (iii) any combination thereof; and (B) The sale, lease, exchange, or other disposition of any interest in real property, or any combination thereof.

Section 7001: General rule of validity (g) Notarization and Acknowledgment

If a statute, regulation, or other rule of law requires a signature or record relating to a transaction in or affecting interstate or foreign commerce to be notarized, acknowledged, verified, or made under oath, that requirement is satisfied if the electronic signature of the person authorized to perform those acts, together with all other information required to be included by other applicable statute, regulation, or rule of law, is attached to or logically associated with the signature or record.

(h) Electronic Agents

A contract or other record relating to a transaction in or affecting interstate or foreign commerce may not be denied legal effect, validity, or enforceability solely because its formation, creation, or delivery involved the action of one or more electronic agents so long as the action of any such electronic agent is legally attributable to the person to be bound.

CALIFORNIA CODES CIVIL CODE SECTION 1633.1-1633.17

(e) "Electronic" means relating to technology having electrical, digital, magnetic, wireless, optical, electromagnetic, or similar capabilities.

(f) "Electronic agent" means a computer program or an electronic or other automated means used independently to initiate an action or respond to electronic records or performances in whole or in part, without review by an individual.

(g) "Electronic record" means a record created, generated, sent, communicated, received, or stored by electronic means.

(h) "Electronic signature" means an electronic sound, symbol, or process attached to or logically associated with an electronic record and executed or adopted by a person with the intent to sign the electronic record.

1633.11. (a) If a law requires that a signature be notarized, the Requirement is satisfied with respect to an electronic signature if an electronic record includes, in addition to the electronic signature to be notarized, the electronic signature of a notary public together with all other information required to be included in a notarization by other applicable law.

(b) In a transaction, if a law requires that a statement be signed under penalty of perjury, the requirement is satisfied with respect to an electronic signature, if an electronic record includes, in addition to the electronic signature, all of the information as to which the declaration pertains together with a declaration under penalty of perjury by the person who submits the electronic signature that the information is true and correct.

(j) "Information" means data, text, images, sounds, codes, computer programs, software, data bases, or the like.

(k) "Information processing system" means an electronic system for creating, generating, sending, receiving, storing, displaying, or processing information.

(l) "Person" means an individual, corporation, business trust, estate, trust, partnership, limited liability company, association, joint venture, governmental agency, public corporation, or any other legal or commercial entity.

(m) "Record" means information that is inscribed on a tangible medium or that is stored in an electronic or other medium and is retrievable in perceivable form.

(n) "Security procedure" means a procedure employed for the purpose of verifying that an electronic signature, record, or performance is that of a specific person or for detecting changes or errors in the information in an electronic record. The term includes a procedure that requires the use of algorithms or other codes, identifying words or numbers, encryption, or callback or other acknowledgment procedures.

(o) "Transaction" means an action or set of actions occurring between two or more persons relating to the conduct of business, commercial, or governmental affairs.

In view of the current legislation, the reality of remote electronic notarization is within reach and the benefit to such legislation is the stimulating and secure effect it will have in the continuing development of trustworthy e-commerce transaction. The National Notary Association is true to form to its own rules as they pertain to the Model Notary Act of 2002; mandating that the "personal appearance of an individual in a notarization transaction is the only way to truly satisfy the verification of identity and intent of the potential signatory. All be it, this view is time honored and again is the cornerstone of the notarization process; in this era of identification technology it appears to be short-sighted and is not in line with the electronic evolution that is currently shaping the notary environment and our world and specifically address the highly volatile issue of identity theft as it pertains to e-commerce. In addition the (NNA) position is not in line with the idea of the authors of both the (E-SIGN) and (UETA) Acts.

One venue that has experienced an enhancement of a process that at one point required a personal appearance by the client is banking. For years bank tellers performed acts analogous to a notary public. The tellers function was not only to process financial transactions for both deposit and withdrawals, they also provided a screening function that basically upheld the integrity for these transactions. However, at the advent of the automated teller machine (ATM) both banks and their clients experienced not only a seemingly parallel since of integrity yet an even greater expansion of banking services and subsequent increase in banking revenues. Some financial transactions require notarization which through this art can occur remotely and electronically, meeting crucial deposit or withdrawal deadlines by accessing the proposed on-line Virtual ANNAM. This proposed art parallels this same evolution yet without the integration of cash based transactions though personal information is brought to bear as the object of protection. According to Daniel J. Greenwood, Esq., Director, E-Commerce Architecture Program of the Massachusetts Institute of Technology; observes that, "In the future, one can imagine a robust suite of additional roles and services provided by electronically capable notaries. For instance, a notary who is physically present with an end-user of a highly secure system could verify that the person signing on, or executing a command, on that system is in fact the individual that he or she purports to be.

The notion and spirit of this particular art's presentment for remote electronic notarization certainly promotes and underscores the fact that the notary public arena is at the dawn of a new day; a day not to be feared, but rather a day of anticipation when a notary public will be equipped with a system that will allow them to perform their duly sworn function (remotely and electronically) implementing the latest in technology to assist them as they witness for the state or country wherein they are commissioned.

Some patents have been issued on remote signing and party validation. Examples of these patents are disclosed herein. U.S. Pat. No. 6,904,416 issued on Jun. 7, 2005 and US published application 2002/0143711 to Nicholas N. Nassiri discloses a signature verification using a third party authenticator via a paperless electronic document platform. While this patent discloses an authorization system, it does not provide for a secure visual verification using a kiosk type station.

U.S. Pat. No. 7,096,005 issued on Aug. 22, 2006 to Lai et al. discloses a method of carrying out a safe remote electronic signing by cellular phone. While this patent provides for an e-signature it does not provide for the other requirements for a notary authorization.

U.S. Pat. No. 7,130,452 issued on Oct. 31, 2006 to Bolle et al. discloses a system and method for multi-party validation, authorization and/or authorization via biometrics. The biometrics includes signature, thumb print, voice print and retinal scan. The biometrics allows for authorization from a person they exist at a doorway or other portal to grant access. There are also no provisions for passing documents or for a kiosk.

Although prior arts, U.S. Pat. Nos. 6,904,416 and 7,096,005 contain varying approaches to both electronic signing and signature verification, neither allow for the remote usage of the electronic journal and nor do they address a method of compensation for the notary and ultimately these arts neglect to offer a potential signatory the opportunity to receive notary services remotely through electronic devices as well as receive notary services utilizing remote electronic identity authorization devices on-line.

What is needed is a simple kiosk that duplicates all the authorization requirements that exist when a person is sitting in front of a notary. The proposed application provides these pieces with a kiosk that allows a notary to authentic the signer from a distal location.

BRIEF SUMMARY OF THE INVENTION

It is an object of the remote electronic verification and authorization is to provide a secure sign-on, including highly reliable authentication and authorization linkages, is one of the key challenges to the online conduct of important, high-value and sensitive transactions. If e-Notarization could be leveraged as a relatively inexpensive and accessible method of ensuring the integrity of important electronic transactions in business and government, much time and money could be saved. Currently, it is not unusual for high-ranking executives and public officials to fly across continents and oceans in order to formalize the execution of a contract or the closing of a negotiation. Of course, the human, social and ceremonial element of in-person contact at the start, middle and end of a negotiation serve important purposes. However, the inordinate reliance on travel and overnight courier services currently adding to the cost of doing business constitutes a considerable aggregate drag on the economy, as well as on individual businesses and government agencies. Cost and time-saving solutions are needed, and it is possible that "electronic notaries" are one such solution.

It is an object of the remote electronic verification and authorization to provide potential additional value-added roles for e-Notaries that could include the secure original enrollment of a person into a digital system. For example, if a trusted, trained and professional electronically capable notary were to attest to identity and other facts related to a person's enrollment on an online transactional system, much more confidence could be had that the users of that system were not sophisticated con artists. In addition, electronic notaries could provide trusted reputation or introduction services for people interacting online. The weight of a reputation, based on trusted people who are personally known to other trusted people, is a heavy benefit for an online system. Currently, the value of being personally known to a notary is already afforded greater weight under the law, because such people do not need to present the notary with identity documents. One can also imagine the increased future need for a trusted, regulated party to certify digitally the accuracy and integrity of official or important electronic information. By providing an electronic notarization of sorts to digital video, databases and other electronic systems, it is possible to determine whether the data has changed since a given point in time.

It is an object of the remote electronic verification and authorization to provide electronically capable notaries that could provide one of the countermeasures to ensure that our official and important records are trustworthy over time." Mr. Greenwoods' comments in no uncertainty underscore this invention's approach to remote e-notarization and the potential effect it will have on the evolving environment of e-commerce. More recently, one city's police commission is considering a new system that would help crime victims call for help without making an actual phone call. Instead the system would allow people to send photos and text messages with their cell phones. There are many situations in which victims are too afraid to call 911 because the suspect or attacker may hear the voice on the other end of the line. That's where the whole idea of using cell phone pictures or text messages comes into play. The whole idea of the system is to be able to call 911 for help without saying a word. The city commission will look into a system that could handle those types of calls. It could take up to five years and thousands of dollars to install the full system that could handle text messages, video and photos, but a modified version of the system could be up and running by the end of the year. The city's 911 dispatch center receives nearly 2 million calls a year. It's not just about reaching those in need but it is also about potentially solving crimes, as cell phone images and text messages could provide a vital clue in many of those cases. In conclusion, the aforementioned is a clear indication that the technological needs that the provisions of the E-sign and U.E.T.A Acts are being considered and implemented in other venues of public service.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
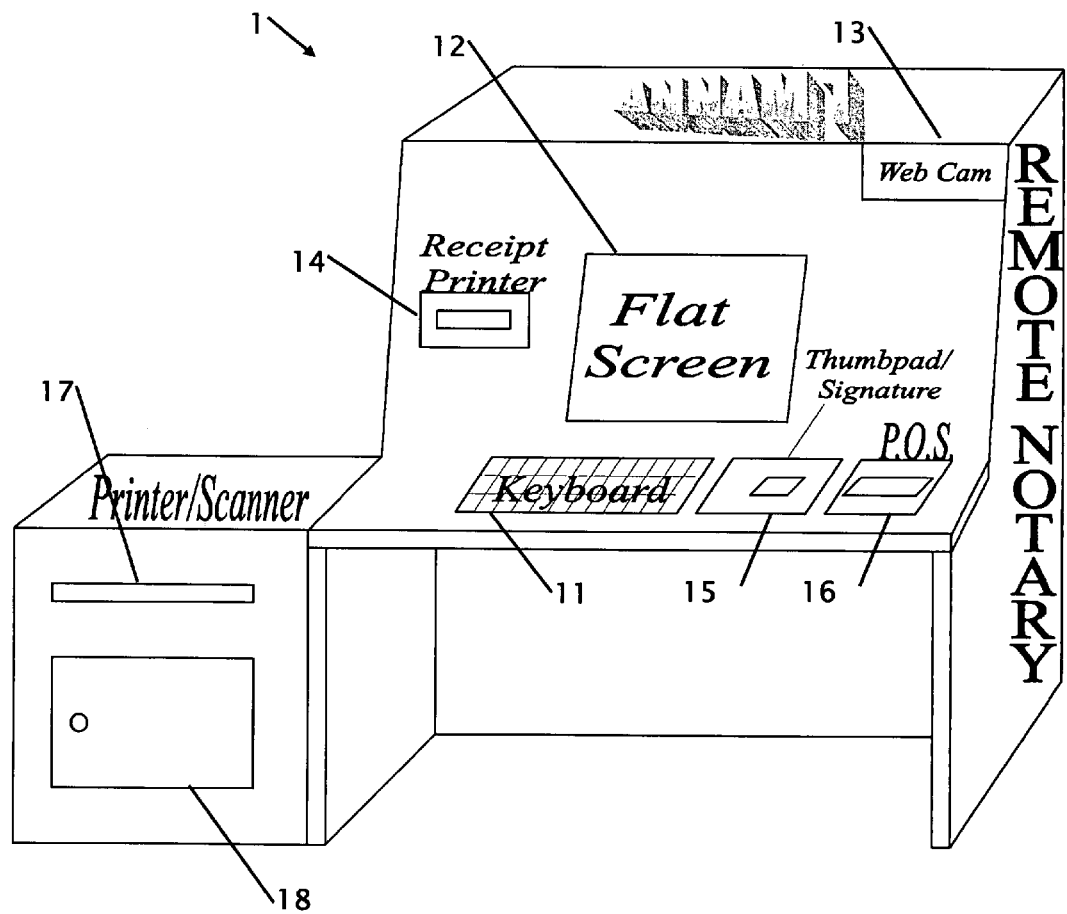
FIG. 1 shows a front view of the kiosk.

FIG. 1 shows a front view of the kiosk. It is important that an understanding of the laws and regulations both current and future, amendments, and their subsequent allowances and disallowances that the spirit, scope, and inchoative nature of this invention is based. Any changes, alterations, or modification in this art are considered to be seen and included within this present invention however regulated on all levels of adjudication and legal precedence.

A person needing notary services will "personally appear" through "legal technological allowances" and the remote notary will "witness" the signing of documents or attest a signature through "legal technological allowances." The current art of this invention will function and be housed in an electronic device called the ANNAM (Automated Notary Network Access Machine) and will be interfaced to an authorized network of notaries that will employ registered P.D.A. (Personalized Digital Assistants) and authorized servers that will interfaced with the satellite ANNAM allowing for the remote electronic notarization transactions, verification and notary compensation. Depending on the type of document clients will be assigned either a notary or a certified notary signing agent. By law notaries are given 15 days to comply with records requests—half the time that attorneys typically are given to fulfill such requests for court purposes. This has caused undue pressure for notaries to comply with due to the necessary research and reliance on a manual journal that may or may not be accurate. The authorized servers of the proposed ANNAM system can eliminate this pressure by providing immediate access to their electronic notary journal to create a profile for each generated ANNAM transaction.

Notaries, with their registered commission identification number, can have 24/7 access to their personal electronic journals in order to create a journal profile of a particular transaction and simply forward the profile to the requesting party. This will not only save time but virtually eliminate the notary potentially being fined for non-compliance. Regarding on-line notary transactions whether loan docs, deeds, e-commerce, etc., with the required system components, an internet user will be afforded the opportunity to have their transactions notarized by using the on-line Virtual ANNAM, contact a live notary on the notary's P.D.A. (Personal Digital Assistant) and have their on-line transactions witnessed by a notary public and or a certified notary signing agent commissioned in their state or country.

The kiosk 1 consists of a custom desk containing all the components necessary to fulfill the notary function. It is also contemplated that the kiosk can be an upright terminal. The configuration shown in FIG. 1 is one contemplated embodiment, but other embodiments are contemplated including a vertical upright kiosk that includes the necessary components. The kiosk shown includes a keyboard 11 for entry of text information, but other data input devices can include but not be limited to a keyboard, mouse, scanner, touch screen, camera or trackball. A display screen 12 for visual viewing of the scanned documents, notary, signature and other visual information. The display can be a flat panel or CRT and may include a touch screen. A camera 13 that interfaces with the internet or other similar data transfer medium. The camera 13 is used by the notary to visually verify the person, and any identification such as a driver's license, bank card, photo identification, credit card, or military identification that would be used to verify that the person is correctly represented. It is also contemplated that the camera can record the transaction for future reference or verification.

A printer 14 for printing receipts that prove the transaction took place and that payment was made for the notary service. A thumb pad signature 15 input device that is used to record and verify a finger print. Several types of thumbprint devices are available that record a thumbprint and the image(s) are placed in the notary journal. It is also contemplated that other types of verification can be used including but not limited to retina scans, facial recognition, DNA, signature voice and DNA. A P.O.S. [point of sale] Device 16 is used to enter credit card information or a driver's license. The P.O.S. device is a card reader. A printer 17 with a storage cabinet 18 for storing supplies is provided to print a full sheet of information.

Figure 2:
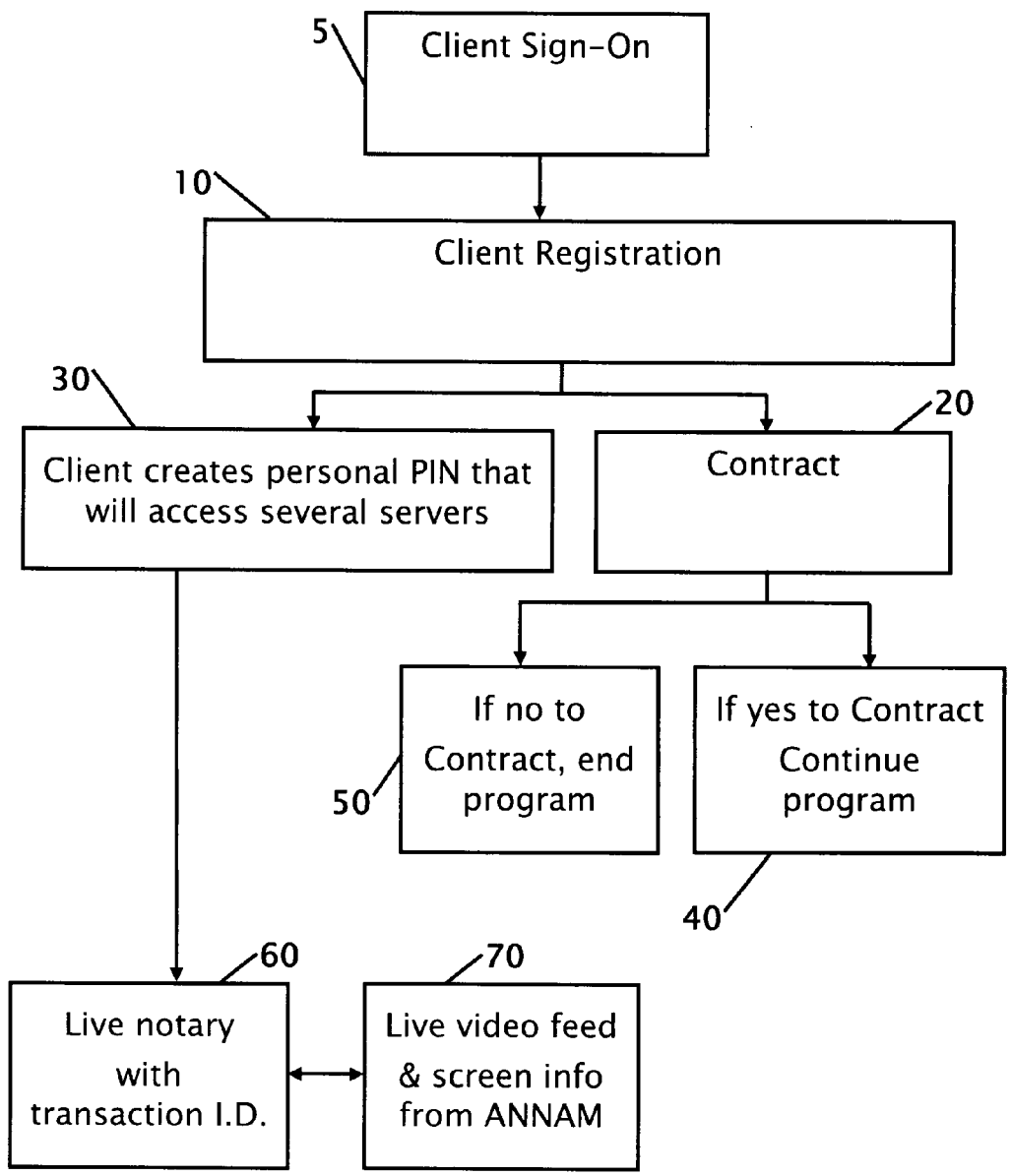
FIG. 2 shows a block diagram of the client sign-on steps.

FIG. 2 shows a block diagram of the client sign-on steps. To engage in the process of this invention, the requirements are that a system meets the legal parameters set forth as its basis. Heretofore, the current device incorporates several electronic components: (Electronic Server Authority (ESA), Audio/Video Transmission Software/Hardware for Cellular/PDA Device or Portable P/C Device, Electronic signature pad, Electronic Biometric Thumbprint Pad 15, Electronic Biometric Retina Scan*(optional), P.O.S. 16 [point of sale] Device, Electronic Digital Web Cam 13, Electronic Touch Screen Technology, Electronic Records Delivery System, Electronic Notary Seal, Electronic Notary Journal, Electronic Scanner/Printer) 14 and 17. The Remote Electronic Notarization transaction commences when a potential signatory 5 requiring a notarization visits the ANNAM at an authorized location. Potential signatory 5 will, via the ANNAM (ESA) Electronic Server Authority, log on 10 and accept 40 or deny 50 the contract authority 20 (C/A) by simply using the touch screen 12 technology the ANNAM monitor is deployed. If C/A is denied 50, the transaction will terminate. If C/A 20 is accepted, transaction will continue and potential signatory will create a personal encrypted pin number 30 for security and future access. Signatory via video/audio 60 & 70 transmission software for cellular/PDA or portable PC device will establish a broadband wireless cellular communication connection with a live notary. Other connection means are contemplated including but not limited to internet, cellular phone, radio communication, microwave dish, cable line, or phone line.

Figure 3:
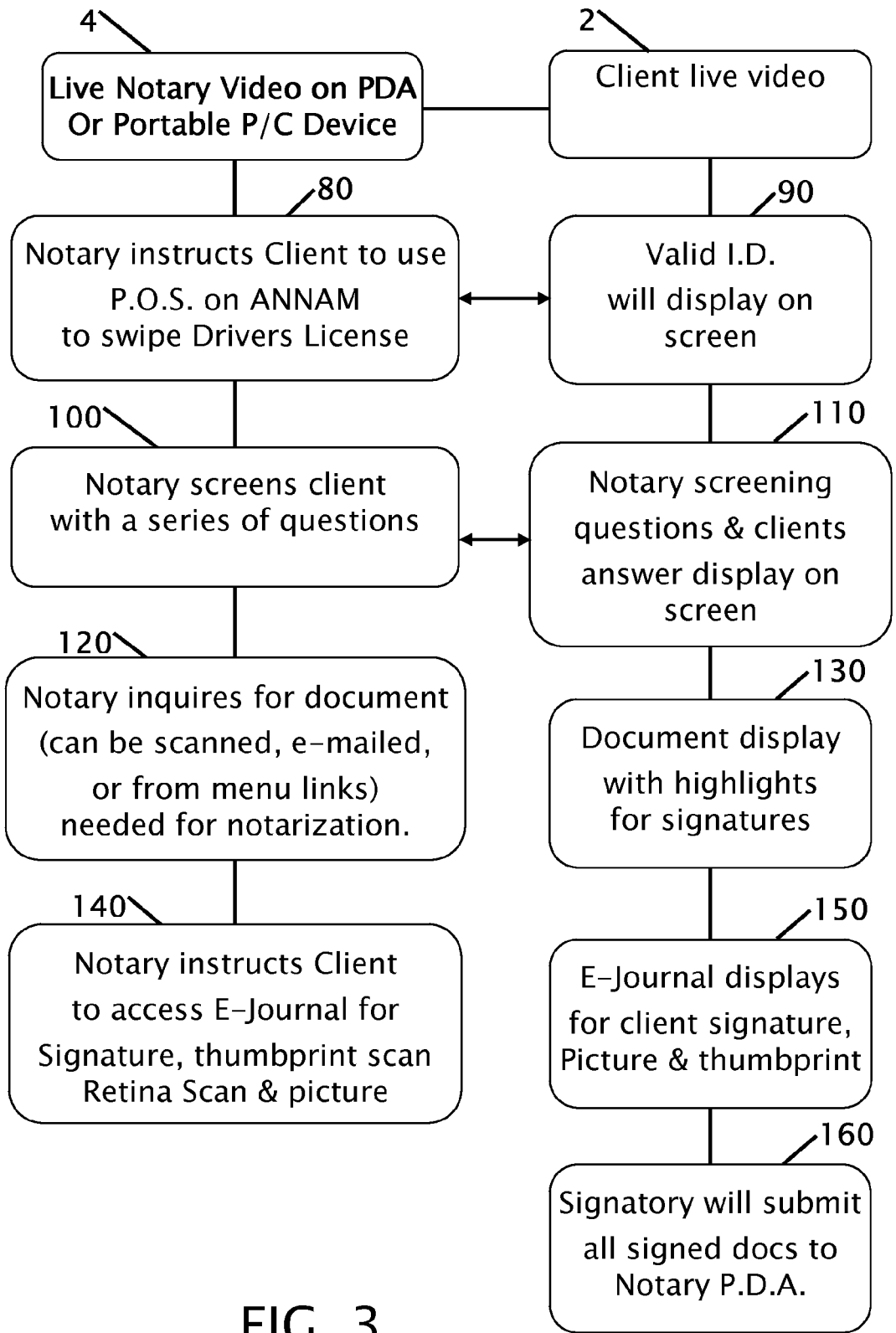
FIG. 3 shows a block diagram of the authentication process.

FIG. 3 shows a block diagram of the authentication process 4. The Signatory 80 will implement the P.O.S. device using a valid I.D. 90 to submit magnetic stripped data for real-time identification validation 2 creating an electronic record. Live notary 100 will conduct an interview consisting of a series of questions for potential signatory screening. Potential signatory 110 will answer a series of yes/no questions creating an electronic record. Implementing the ANNAM (ESA) Electronic Server Authority 120, signatory will have the option of scanning documents, or access the electronic document repository and select a document germane to the county, province, state, or country of their choice and retrieve electronic documents from an electronic records delivery system uploading or copying the electronic documents into the ANNAM (ESA) Electronic Server Authority. The documents may include but not be limited to loan, mortgage, deed, assignment, voting or authorization. Signatory, using the electronic signature pad 15, will sign all signature alerts highlighted 130 on the selected documents satisfying the signature requirements for the specified documents to be electronically notarized. Notary 140 will, instruct signatory to access the electronic notary journal. Signatory 150 will implement the electronic signature pad to affix their signature execute retina scan and thumb-print scan 150 (all live scan thumbprint will simultaneously be submitted to a authorized thumb-print verifier 160 for additional verification of signatory, and via digital web camera, capture a digital picture/video 150 of the signatory creating electronic record. Upon completion of electronic journal entry potential signatory will be instructed to close journal.

Figure 4:
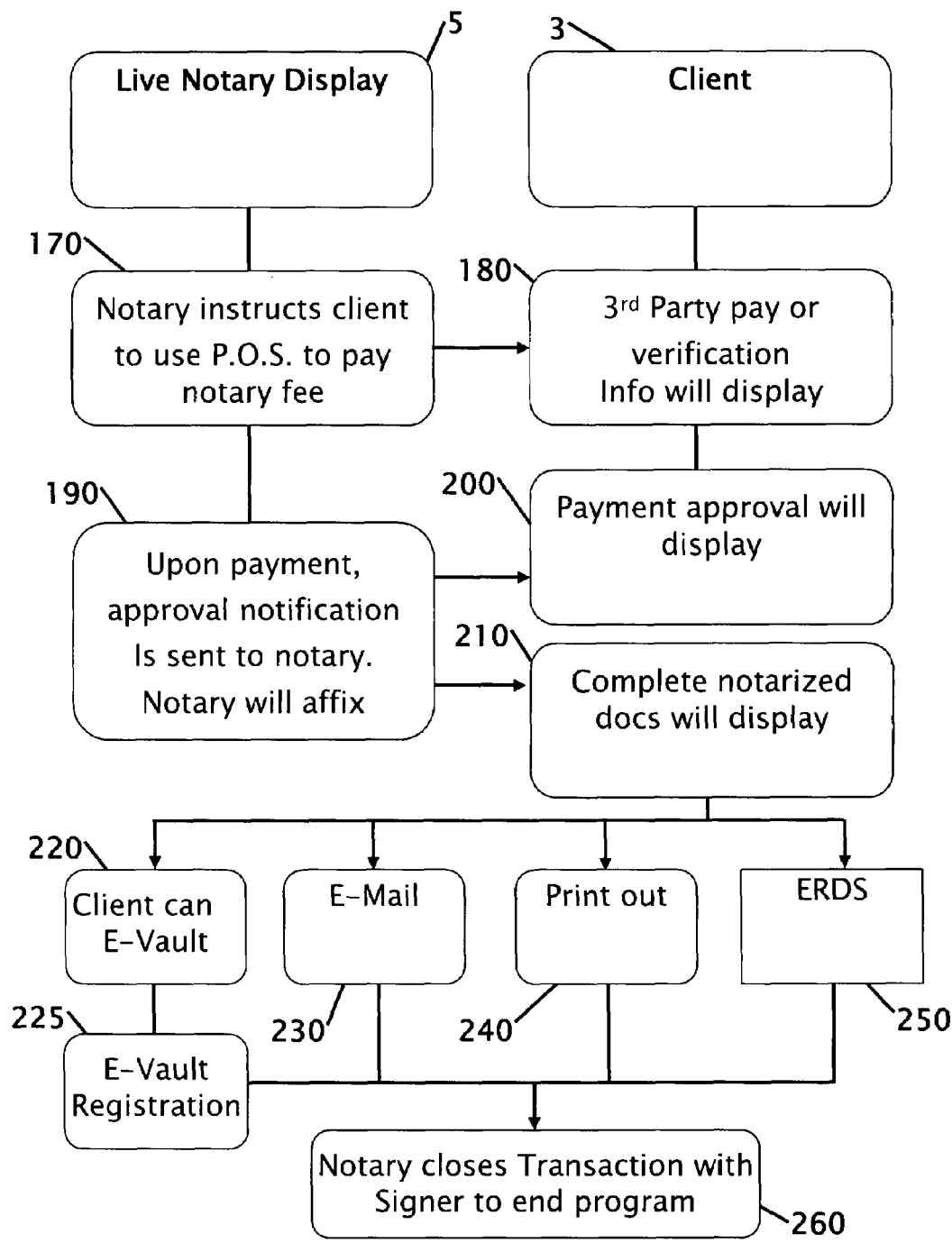
FIG. 4 shows a block diagram of the payment process for the service.

FIG. 4 shows a block diagram of the payment process for the service between a live notary display 5 and a client 3. Signatory will submit to notary 170 via electronic records delivery system, the electronic record of documents to notary for verification of signatory information and electronic document record evaluation. Upon notary authorization of payment 180, signatory will input 80 into P.O.S. information for payment and deposit of notary fee into notary financial institute via third party payment verifier 180. Third party payment verifier 200 will confirm signatory payment information to notary. Notary will affix electronic notary seal 190 and electronic notary signature and via electronic record delivery system submit electronic record of notarized documents to ANNAM 210 (ESA) Electronic Server Authority location of signatory. Signatory will retrieve electronic notarized documents via the electronic records delivery system and have the option to electronically archive documents E-vault 220 in an on-line repository for later retrieval, send documents via electronic records delivery system to authorized receiver of the county recorder or other locations by E-mail 230, ERDS 250, print documents 240. Notary and Signatory sign-off 260 ANNAM (ESA) Electronic Server Authority and program terminates. An E-vault is disclosed that allows a previous signer to log in and retrieve previously stored documents without the intervention of a live notary 225.

Thus, specific embodiments of a virtual notary kiosk have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A remote notary platform comprising:
   a ANNAM kiosk with manual user input capabilities, video monitoring, at least one biometric entry device, internet connectivity, point of sale payment input capability, document scanning and printing capability that is connected through a data link for a transaction with;
   a live distal remote notary that oversees and directs signing and authentication of the signatory wherein;
   a potential signatory requiring a notarization visits the ANNAM kiosk and initiates an interface with the ANNAM kiosk to create a personal encrypted pin number;
   establish a distal real-time communication connection with video/audio hardware and software for a cellular/PDA or portable PC device with the live distal remote notary on the notaries cellular/PDA, computer or portable PC device where the potential signatory for the transaction for notarization of document(s) maintains and continues the notarization transaction with said live distal remote notary using a digital web camera;
   the potential signatory submits a driver's license or similar magnetic stripped data for real-time identification validation;
   the live distal remote notary conducts an interview consisting of a series of questions for potential signatory screening;
   if the verification of identity and intent of the potential signatory is insufficient or the signatory does not want to form a notary contract with a contract authority the transaction terminates;
   the signatory scans document or has access to an electronic repository of document(s) that are sent electronically to said live distal remote notary;
   the signatory uses the manual user input to sign and satisfying the signature requirements for the specified documents to be electronically notarized;
   the signatory accesses and signs an electronic notary journal and enters at least one biometric authorization parameter;
   identifies a delivery mode for the notarized document;
   interfaces with the point of sale payment input device to authorize payment, and
   the live distal remote notary affixes an electronic notary seal, electronic notary signature and submits the electronic record of notarized documents in the delivery mode identified by the signatory from said live distal remote notary.

2. The remote notary platform according to claim 1 that further includes archival capabilities for the transaction.

3. The remote notary platform according to claim 1 wherein the point of sale device is a magnetic card reader or a data card reader to identify a distal potential signatory.

4. The remote notary platform according to claim 1 wherein the biometric authorization parameter is a fingerprint reader, a retinal scanner, a facial recognition, a voice recognition device or a signature entry device.

5. The remote notary platform according to claim 1 wherein the manual user input capability is a keyboard, mouse, scanner, touch screen, camera, or trackball.

6. The remote notary platform according to claim 1 that further includes capability to forward the notarized document to a third party.

7. The remote notary platform according to claim 1 wherein the communication connection is by means of the internet, cellular phone, radio communication, microwave dish, cable line, or phone line.

8. The remote notary platform according to claim 1 wherein the transaction is provided over a secure data link.

9. The remote notary platform according to claim 1 wherein data is encrypted over the data link.

10. The remote notary platform according to claim 1 wherein the transaction authorizes notarized documents where more than one signatory is involved and each signatory is distal from the live distal remote notary during notarization.

11. The remote notary platform according to claim 1 wherein the live distal remote notary can insert identifiers into the documents to be signed to identify where the signature is required to sign.

12. The remote notary platform according to claim 1 wherein the magnetic stripped data is a driver's license, bank card, photo identification, credit card, or military identification.

13. The remote notary platform according to claim 1 wherein the personal encrypted pin number is usable to retrieve previously entered information, transactions and to fill in forms for future transaction.

14. The remote notary platform according to claim 1 wherein the personal encryption pin number is transferable to remote notary platforms that are distal from the remote notary platform where the personal encryption pin number was first created for security and future access.

15. The remote notary platform according to claim 1 wherein the electronic repository of documents contains documents germane to the county, province, state, or country of their choice and retrieve the electronic documents.

16. The remote notary platform according to claim 1 that further includes a receipt printer for printing a receipt for the monetary payment of the transaction.

17. The remote notary platform according to claim 1 wherein the ANNAM kiosk is a vertical upright terminal or a desk type terminal.

18. The remote notary platform according to claim 1 wherein the ANNAM kiosk includes the ability to affix a notary seal to the notarized document.

19. The remote notary platform according to claim 1 wherein the notary journal includes a sortable database to sort for signers, documents, and dates.

20. The remote notary platform according to claim 1 wherein the video hardware and software that records the transaction for future reference or verification.

* * * * *